(12) United States Patent
Anducas Aregall et al.

(10) Patent No.: US 9,919,428 B2
(45) Date of Patent: Mar. 20, 2018

(54) HEAD AND AUTOMATED MECHANIZED METHOD WITH VISION

(71) Applicant: LOXIN 2002, S.L., Navarra (ES)

(72) Inventors: Jordi Anducas Aregall, Navarra (ES); Carlos Ganchegui Iturria, Navarra (ES); Jose Javier Galarza Cambra, Navarra (ES)

(73) Assignee: Loxin 2002, S.L., Navarra (ES)

(*) Notice: Subject to any disclaimer, the term of this patent is extended or adjusted under 35 U.S.C. 154(b) by 66 days.

(21) Appl. No.: 14/891,630

(22) PCT Filed: May 15, 2014

(86) PCT No.: PCT/ES2014/070403
§ 371 (c)(1),
(2) Date: Nov. 16, 2015

(87) PCT Pub. No.: WO2014/184414
PCT Pub. Date: Nov. 20, 2014

(65) Prior Publication Data
US 2016/0082598 A1 Mar. 24, 2016

(30) Foreign Application Priority Data
May 17, 2013 (ES) .................................. 201330713

(51) Int. Cl.
*B25J 11/00* (2006.01)
*B25J 19/02* (2006.01)
(Continued)

(52) U.S. Cl.
CPC ........... *B25J 11/005* (2013.01); *B21J 15/142* (2013.01); *B25J 9/1692* (2013.01); *B25J 9/1697* (2013.01);
(Continued)

(58) Field of Classification Search
CPC ...... B25J 11/005; B25J 9/1692; B25J 9/1694; B25J 11/007; B25J 19/02; B25J 19/022;
(Continued)

(56) References Cited

U.S. PATENT DOCUMENTS 5,014,183 A * 5/1991 Carpenter ............ G05B 19/425
318/568.19
5,615,474 A * 4/1997 Kellner ............ G05B 19/41815
29/243.53
(Continued)

FOREIGN PATENT DOCUMENTS

CN 101205662 A 6/2008
CN 101726296 A 6/2010
(Continued)

OTHER PUBLICATIONS

Choi et al., A Study of Flexible Setup Automation using Robot, 1997, IEEE, p. 40-44.*

*Primary Examiner* — McDieunel Marc
(74) *Attorney, Agent, or Firm* — Notaro, Michalos & Zaccaria P.C.

(57) ABSTRACT

An automated machining head with vision and procedure includes a pressure foot provided with side windows with the capacity to open and close, encasing the machining tool, associated with a vertical movement device provided with mechanical locking, vision equipment connected to a computer and a communications module. The main advantage is endowing an anthropomorphic robot, originally designed for the car industry and with relatively low accuracy, with a notably higher machining accuracy, equivalent to equipment of a much greater accuracy or to parallel kinematic-type robots, also compensating, in real-time and in a continuous manner, for off-centring and loss of perpendicularity by the pressure foot, which are common in conventional heads and are a source of errors and inaccuracy.

14 Claims, 6 Drawing Sheets

(51) Int. Cl.
  *B21J 15/14* (2006.01)
  *B25J 9/16* (2006.01)
  *G06T 1/00* (2006.01)

(52) U.S. Cl.
  CPC ............. *B25J 11/007* (2013.01); *B25J 19/02* (2013.01); *B25J 19/022* (2013.01); *B25J 19/023* (2013.01); *G06T 1/0014* (2013.01); *Y10S 901/10* (2013.01)

(58) Field of Classification Search
  CPC ..... B25J 19/023; B21J 15/142; G06T 1/0014; Y10S 901/10
  USPC .......................................... 700/245, 258, 259
  See application file for complete search history.

(56) References Cited

U.S. PATENT DOCUMENTS

| | | | | |
|---|---|---|---|---|
| 5,932,122 A | * | 8/1999 | Hong | B23K 9/1272 219/124.34 |
| 6,430,472 B1 | * | 8/2002 | Boillot | G05B 19/056 219/121.61 |
| 6,575,444 B1 | * | 6/2003 | Bidaud | B23K 37/0443 269/152 |
| 6,741,912 B2 | * | 5/2004 | Olesen | B23Q 1/5462 180/8.1 |
| 6,855,099 B2 | * | 2/2005 | Hazlehurst | B21C 51/005 29/281.5 |
| 7,174,238 B1 | * | 2/2007 | Zweig | H04L 67/025 700/245 |
| 8,135,208 B1 | * | 3/2012 | Vangal-Ramamurthy | G06T 7/80 348/E17.002 |
| 8,225,508 B2 | * | 7/2012 | Houis | B21J 15/14 29/407.09 |
| 9,138,894 B2 | * | 9/2015 | Alotto | B25J 9/161 |
| 2003/0144765 A1 | | 7/2003 | Habibi et al. | |
| 2009/0018697 A1 | | 1/2009 | Prat et al. | |
| 2010/0286827 A1 | | 11/2010 | Franzius et al. | |

FOREIGN PATENT DOCUMENTS

| | | |
|---|---|---|
| EP | 0377755 A1 | 7/1990 |
| EP | 1582289 A1 | 10/2005 |
| ES | 2036909 A1 | 6/1993 |
| ES | 2142239 A1 | 4/2000 |
| ES | 2152171 A1 | 1/2001 |
| ES | 2372789 T3 | 1/2012 |
| WO | 03064116 A2 | 8/2003 |
| WO | 2005072917 A1 | 8/2005 |
| WO | 2006019970 A2 | 2/2006 |
| WO | 2007108780 A2 | 9/2007 |

\* cited by examiner

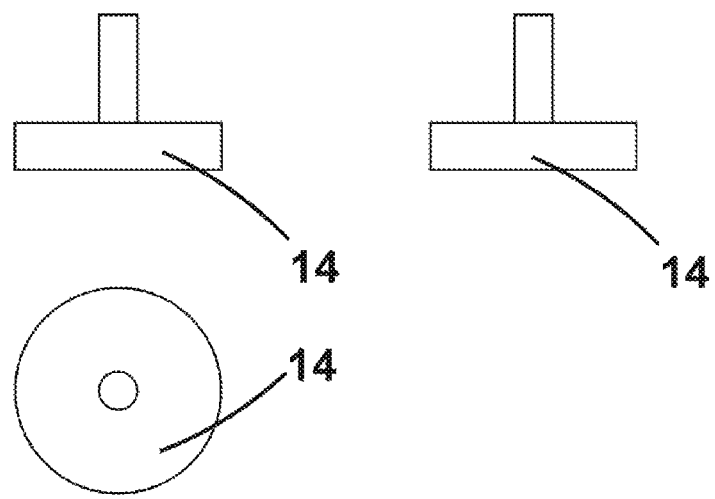

HEAD AND AUTOMATED MECHANIZED METHOD WITH VISION

This description relates, as its title indicates, to an automated machining head with vision of the type used industrially associated with anthropomorphic robot arms to perform various machining tasks, in particular drilling and riveting, controlled by a robot controller module and comprising a pressure foot, provided with side windows capable of opening and closing, encasing the machining tool, associated with an axial movement device provided with mechanical locking, vision equipment connected to a computer and a communications module between the latter and the robot controller module that allows the vision equipment to interact with the robot controller, all of this with a characteristic operating procedure.

FIELD OF THE INVENTION

The invention relates mainly but not exclusively to the field of machining heads, in particular for drilling and riveting, associated with anthropomorphic robot arms.

THE PRIOR ART

Anthropomorphic robots are currently known and widely used in industry, especially in the car industry. They are versatile, relatively inexpensive devices, but their main drawback is their lack of stiffness and consequently their lack of accuracy, which can lead to errors of more than 2 mm, making them unsuitable for applications in which requirements, in terms of accuracy, are greater by several orders of magnitude, such as for instance, machining, drilling and riveting applications in the aeronautical industry, requiring accuracies of hundredths or thousandths of mm.

These degrees of accuracy can be achieved by high-precision equipment or parallel kinematic machines, but they have the drawback of their high cost due to the precision technology required to manufacture them and the control technologies required.

When using anthropomorphic robots there are applications that can improve their accuracy by means of external measuring systems in which, for example, a laser tracker detects the position of the robot head in space and sends out the corresponding orders to correct it, however, in addition to the high cost of this equipment, it has the major drawback that the field of vision between the robot and the external measuring equipment must always be clear, which represents a significant disadvantage and, in most applications, is not possible.

There have been some attempts to improve the intrinsic accuracy of anthropomorphic robots, usually by modifying standard robots in order to add high-accuracy secondary encoders on the output shafts of the reducers that move the robot arm axes and normally replacing, in some cases at the same time, the robot controller with a CNC, thereby achieving a partial increase in its stiffness and improving accuracy but with the drawback of its high cost, eliminating one of the greatest advantages of these robots, as well as resulting in problems with maintenance and adjustments and with spare parts since these are not longer standard or serial robots that form part of the manufacturer's catalogue and hence customers or end users are additionally dependent on the company that modifies the robots.

Also known are Patents ES2152171A1 and WO2007108780A2, which incorporate conventional vision equipment in machine tools but solely to provide a good view of the work area, without achieving increased accuracy.

There are also known applications of video cameras on robots, such as those disclosed in patents WO03064116A2, US2010286827A1, US2003144765A1, E S2142239_A1, ES2036909_A1 and CN101205662, however, as in the previous case, their purpose is to provide a good view of the work area during the programming of the robot, without achieving increased accuracy in an automatic way.

In addition, robots equipped with two cameras are also known, as described in patents CN101726296 and WO2006019970A2, but they do not help to improve the accuracy of the robot, but rather are only for recognising shapes or objects.

Procedures are also known for improving the intrinsic precision of anthropomorphic robots without vision equipment, based purely on mechanical elements, such as that disclosed in patent US2009018697, in which a mechanical system is used to measure the deviations of the robot when additional forces are applied, but which present the problem that when mechanical slippage occurs between the workpiece and the measuring nozzle, it is no longer possible to return to the target point.

DESCRIPTION OF THE INVENTION

To resolve the currently existing problems regarding machining accuracy, improving the perpendicularity and precision of robotic arm movements, the automated machining head with vision that is the subject of this invention has been devised, which comprises a pressure foot, encasing the machining tool, associated with a device for axial movement to the tool axis provided with mechanical locking, associated with vision equipment, which includes several video cameras and, optionally, a laser projector, connected to a computer, provided with specific software for three-dimensional control, and a communications module that permits it to interact with the robot controller. The vision equipment will be preferably 3D-type vision equipment.

The pressure foot is formed by a hood provided with side windows that allow the artificial vision camera or cameras to view the work surface through the openings in the hood when the pressure foot is carrying out its function, that is, while it is in the working position. These side windows have closures which prevent swarf from coming out during machining, since the pressure foot incorporates a suction system to remove the dust and swarf generated during machining The computer is connected via the communications module to the controller module of the robot arm, preferably of the anthropomorphic type, which provides the movements for the machining head, carrying out corrections to the orders of the robot controller module according to the image received from the video cameras forming the vision equipment and to the calculations and predictions that it makes.

The robot controller module may be either an external CNC or the robot's own controller offered by its manufacturers.

This machining head with vision entails a specific operating procedure that permits cancellation of external forces and correction of position.

Cancellation of external forces is based on the known fact that when slight additional force is applied to the robot at its working end or at any other part of the assembly, the robot, due to its low stiffness, loses the position and orientation reached, without the controller being aware of this and hence it will not try to return the robot arm to its initial position. In this procedure kinematic information of the robot is used via the vision system. This information enables the robot to be repositioned, returning it to its correct position, prior to the use of the force which modified its position and orientation.

In the process of cancelling forces it is important to take into account that the robot is faced with a surface on which it wishes to carry out an action that will involve the use of a force that will cause it to modify its real position, without this movement having been indicated directly to the robot controller. In this part of the process it will carry out the following functions:

1. The robot positions itself opposite the work surface.
2. The vision equipment scans the surface and its roughness; it fixes the exact operating point on the surface and obtains the spatial coordinates of the robot.
3. An extra force is applied to the robot, in this case, for example, by the pressure foot against the work surface, which causes the robot to lose its position. No device of the robot informs the robot controller that it has lost its position since loss is determined by mechanical deformations
4. The robot requests the vision equipment to re-scan the surface and measure the movement that has occurred.
5. The vision equipment scans the surface and obtains the movement that has occurred between the present moment and before applying a force. Thus, the device is able to detect, in an external manner, the deviation that exists and to inform the robot controller how much and how it must correct its position to return to the operating point.

The last two steps may or may not be iterative until the robot is finally returned to the operating point or until the residual error is less than a certain value.

As previously mentioned, on the one hand, robots are not particularly precise devices in terms of their positioning and orientation accuracy and, on the other, if additional forces are applied once the robot has reached a certain position, this will alter both its orientation and position. However, many of the tasks and operations to be performed by the head of the robot arm require it to adopt a particular correct orientation in relation to the workpiece surface at the work point in order for it to adequately perform the chief function for which it has been designed. An example of this could be when highly accurate drilling and countersinking is carried out on an aerodynamic surface, in which it is of vital importance that the orientation is totally "normal" or perpendicular to the workpiece surface at each operating point.

The system and procedure disclosed herein allow the robot to recover its original orientation (before applying external forces), assuming that it is adequate to carry out the function, or to adopt an orientation that is normal to the surface of the workpiece at the work point.

The procedure for correcting the orientation is similar to that previously described for correcting the position before applying additional forces and it can be carried out at the same time. In particular, the functions for re-orienting the robot are the same with the exception of:

2. When the vision equipment scans the surface it also calculates and remembers the robot's initial orientation, in the event that this same initial orientation, before applying additional external forces, needs to be recovered.
4. The robot requests the vision equipment to re-scan the surface and measure the current orientation
5. By scanning the surface around the point and carrying out normalization calculations, the vision equipment is able to detect how much the robot orientation has deviated from the original or normal to the surface orientation and it can tell the robot how much and how it should correct its orientation.

The last two steps may or may not be iterative until the robot is returned to the desired orientation, having previously established a tolerance for the maximum permitted orientation error.

In this invention, given that the vision system is capable of viewing the surface of the workpiece before and while additional external forces are applied to the robot, fixing the working point on the workpiece and calculating orientation in relation to it at the same time, the consequences of said forces can be eliminated, returning the robot to the required position and orientation It is known and accepted that the accuracy of anthropomorphic robots is not an important parameter for the customary use for which they were initially designed. Traditionally, the work concept has been based on physically taking the robot arm to each of the required positions and building the workpiece program, saving the said positions to the robot's memory (a process known as "teaching"). Normally the operations carried out with this type of robot are high rate operations, with few points (a couple of dozen at the most). Hence it is not important to ensure that a robot reaches a certain XYZ dimension in the volume of work. What is of interest is for the robot to be repetitive, i.e. for it to, more or less, always go to the same place.

This process allows the accuracy of the robot to be almost identical to its repeatability. To achieve this objective, the robot uses an external element, vision equipment—preferably three-dimensional, to determine the position of certain elements that it will use as external references.

With the use of an external reference much greater accuracy can be achieved in real time. Robot kinematics is calculated in real time so that the repeatability and accuracy of the robot are very similar. Thus, it is possible to determine accuracy with a high degree of resolution since the system can correct the final position to which it must move or reach on a plane or straight line.

The referencing process is carried out via a minimum of two points to plot a virtual line. In the case that a reference plane has to be determined, the system will require a minimum of 3 points to calculate it with the same accuracy.

This part of the process will carry out the following functions, for two reference points:

The robot goes to a programmed point without having to be accurate, at this point it finds a target that it will use as a reference point The vision equipment requests the robot to carry out translation movements around the reference point or target while it inspects this point.

Reference point 1 is determined.

The robot goes to the second programmed point

The vision equipment requests the robot to carry out translation movements around the reference point or target while it inspects this point.

Reference point 2 is determined.

The line that reference point 1 and reference point 2 create is determined.

The corrections via software to offset mechanical distortions that must be applied to the intermediate points between the reference points or near to that path are determined, achieving a positioning error similar to the robot's repeatability.

If it is required to move on a plane, then it must go to at least a third target to determine the corrections on that plane.

In order to correct the position, the artificial vision equipment must be able to have visual access to the workpiece surface at all times; for this purpose a pressure foot with openings is required in order to view inside it once it is in position.

The vision equipment also allows the robot to be provided with additional features, such as, for example, real-time measuring of perpendicularity, measuring of targets, measuring of diameters, quality control of rivets and other features.

This invention is applicable to any type of robot, including anthropomorphic robots, parallel kinematic robots or other types.

ADVANTAGES OF THE INVENTION

The automated machining head with vision that is presented affords multiple advantages over equipment currently available, the most important advantage being that it enables an anthropomorphic robot, originally intended for the car industry and with a relatively low accuracy, to be provided with a machining accuracy that is notably higher, equivalent to equipment of a much greater accuracy, such as for example, machine tools or parallel kinematic type machines.

Another important advantage is that it compensates, in real time and in a continuous manner, off-centring and loss of perpendicularity due to the pressure of the pressure foot, which are common in conventional heads and are a source of errors and lack of accuracy.

It is also noteworthy that, compared to the existing mechanical systems for measuring robot deviations when additional forces are applied, it presents the great advantage that even though the nozzle slips or slides on the workpiece, the target point can always be returned to via the vision system.

Another additional advantage is that, given that it is not affected by sliding, greater preload forces can be used on the pressure foot or more efficient process parameters can be employed.

It is also important to note that the vision equipment corrects the robot positioning points in real time, interacting with its controller, correcting robot errors and inaccuracies.

The invention disclosed herein ensures that the final accuracy obtained no longer depends on the accuracy of the robot but on its repeatability, since it manages to improve accuracy, taking it to values very close to the robot repeatability, which, typically, is around 10 times better than accuracy.

The solution provided here eliminates the need to attach high-accuracy encoders to the output shafts of all of the reducers of the anthropomorphic robot and hardware and additional control software, avoiding modifications to a catalogue robot that may affect its warranty, maintenance and repairs, and, instead, employing a solution formed by three-dimensional vision equipment, a computer system, a communications module and control software, consisting of a much more economical, effective and simple solution.

Particularly noteworthy are the advantages arising from the fact that this invention allows optimization and improvement of drilling, countersinking and riveting processes, improving the flexibility, productivity and efficiency of flexible cells, and contributing to the innovation of the manufacturing technique, with a notable reduction of costs.

DESCRIPTION OF THE FIGURES

To provide a better understanding of this invention, a preferred practical embodiment of an automated machining head with vision is shown in the drawing attached.

In said drawing, FIG. 1—shows a block diagram of the complete assembly of the head, the robot, the computer control system, the robot controller module and the communications module.

FIG. 7—shows elevation, plan and section views of the calibration tool.

PREFERRED EMBODIMENT OF THE INVENTION

Figure 1:
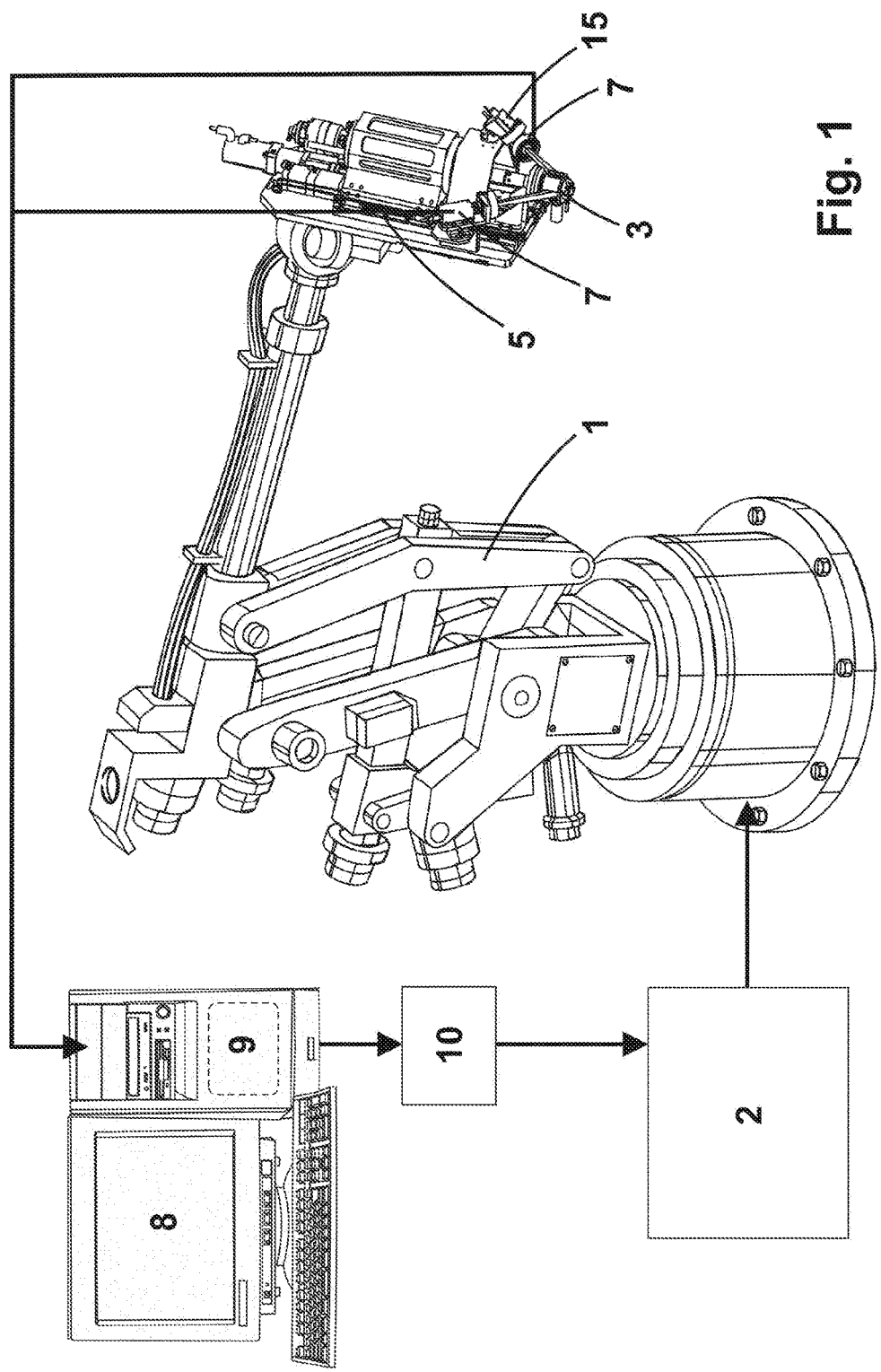
Figure 2:
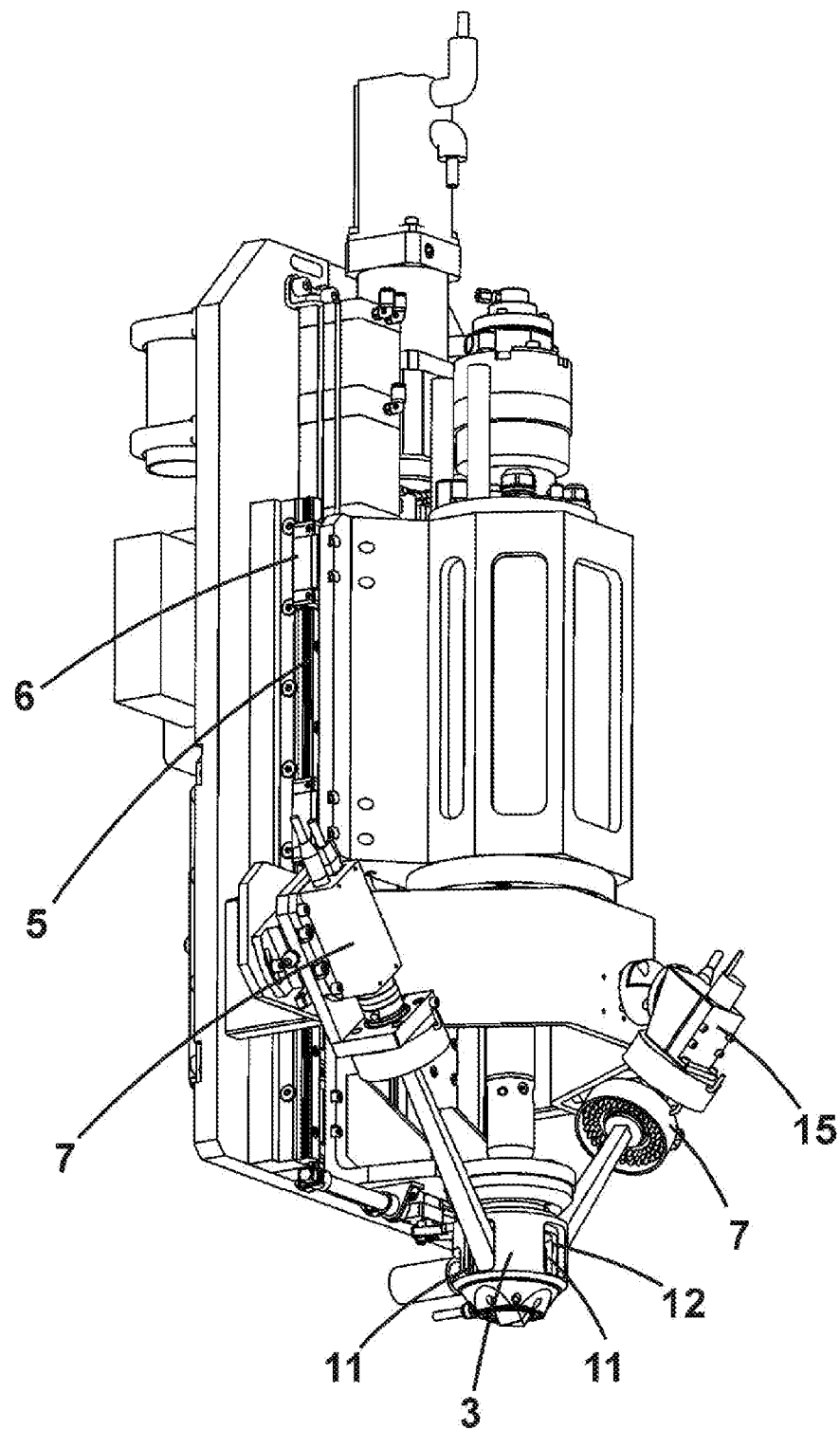
FIG. 2—shows a perspective view of the head.
Figure 3:
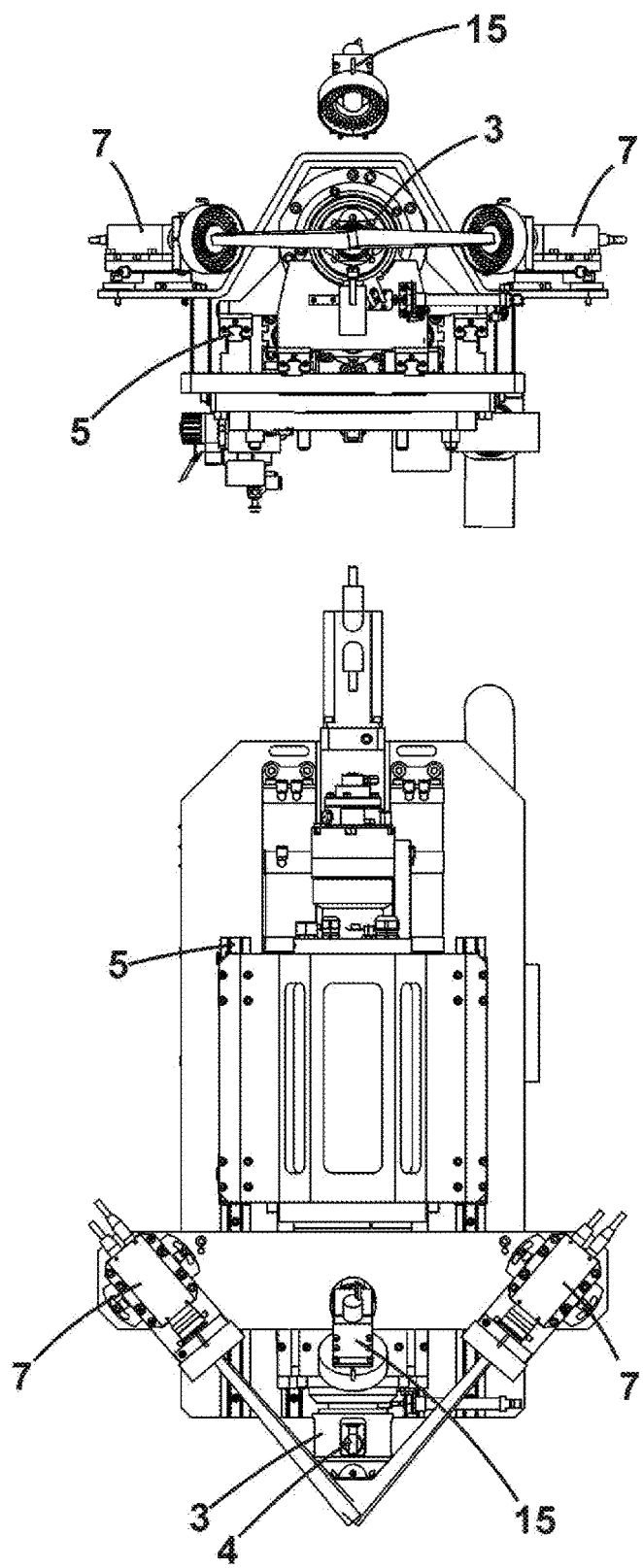
FIG. 3—shows a lower and front view of the head.
Figure 4:
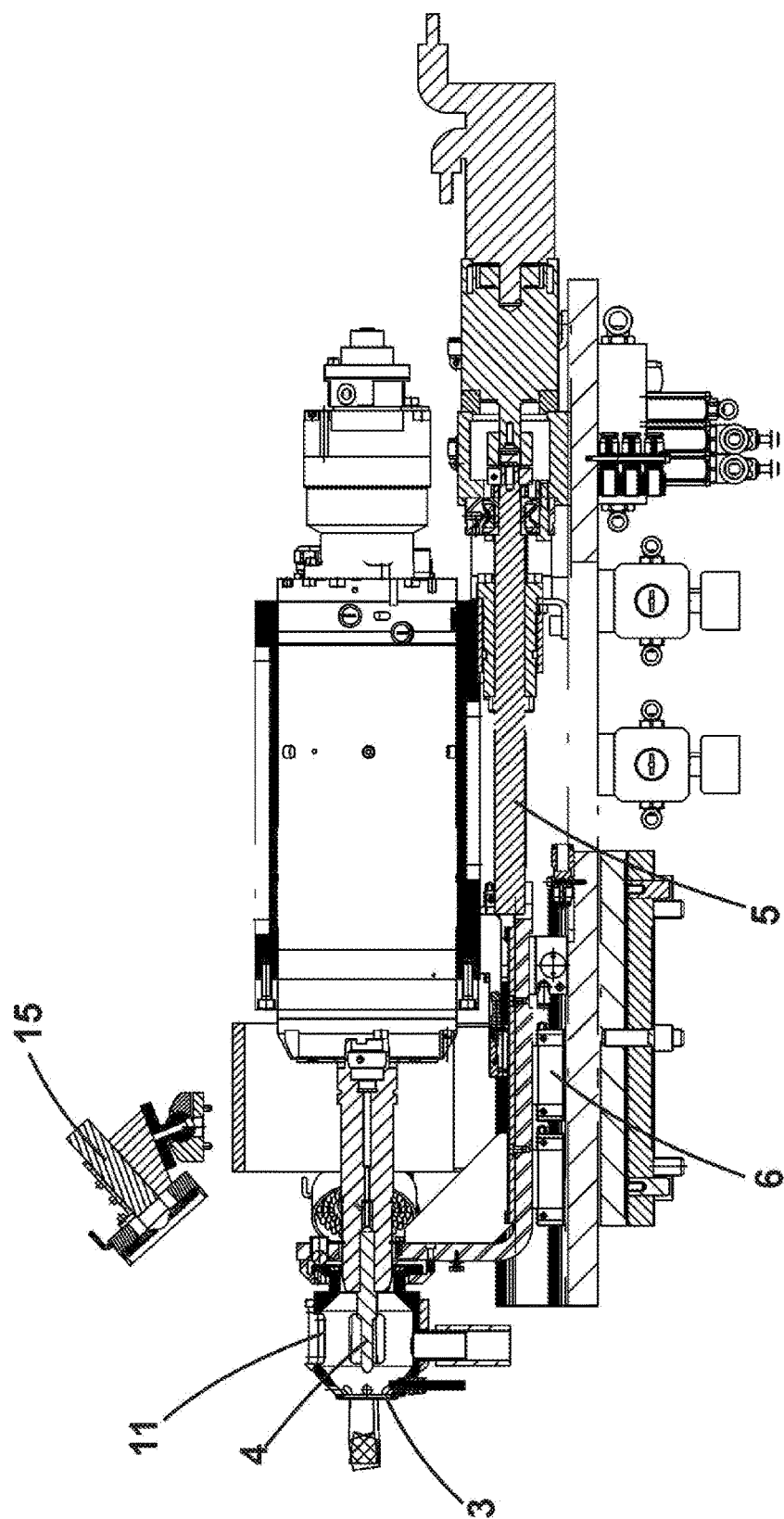
FIG. 4—shows a cross-section side view of the head.
Figure 5:
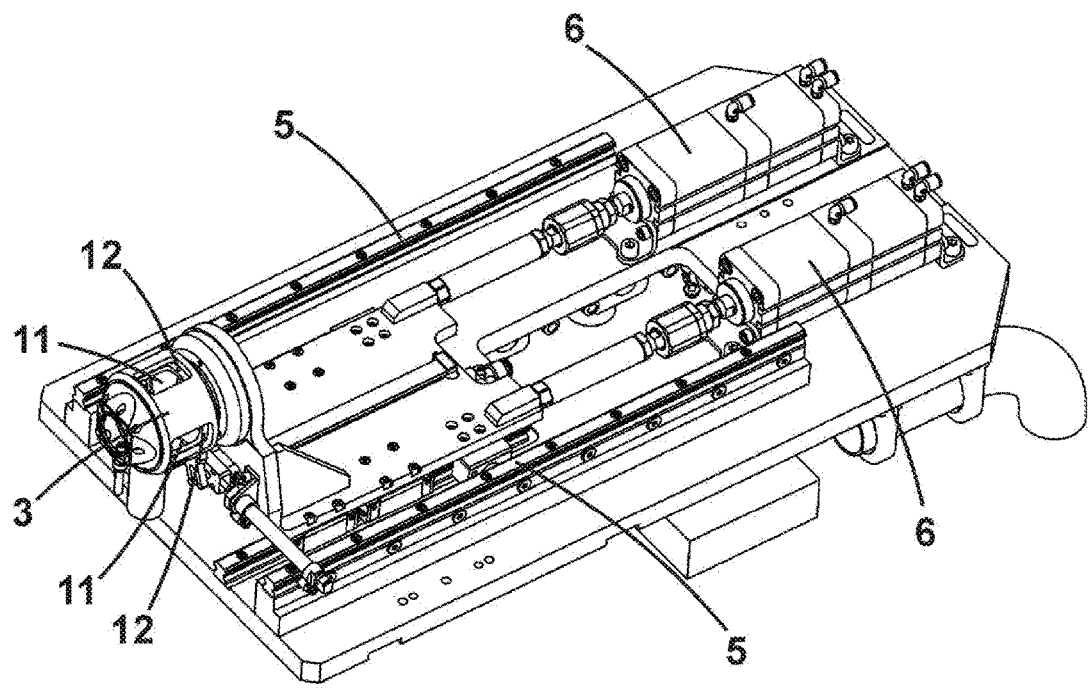
FIG. 5—shows a perspective view of part of the head, with detail of the vertical movement device.
Figure 6:
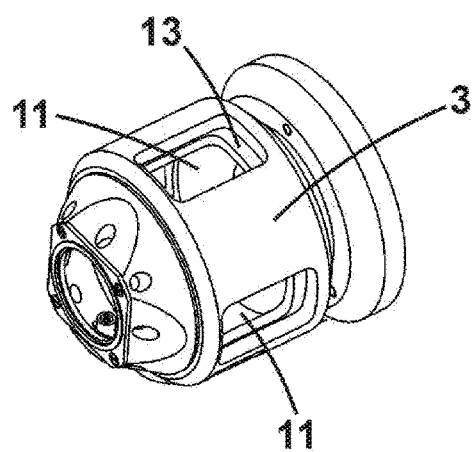
FIG. 6—shows a perspective view of the pressure foot.

The automated machining head with vision and procedure that is the subject matter of this invention is associated with a robot arm (1) to perform various machining tasks, especially drilling and riveting, controlled by a robot controller module (2), and basically comprises, as can be seen in the drawing attached, a pressure foot (3), encasing the machining tool (4), associated with a vertical movement device (5) provided with mechanical locking (6), 3-D type vision equipment provided with at least two video cameras (7), connected to a computer (8) provided with specific software (9), and a communications module (10). The communications module (10) may be either a specific hardware device or a part of the specific software (9).

It is envisaged that the vision equipment may optionally comprise a laser device (15) which projects a cross-shaped beam inside the pressure foot (3). The projection of this cross onto the workpiece to be drilled is used by the artificial vision cameras to know the orientation of the head in relation to the workpiece.

The robot controller module (2) may be either an external CNC or the selfsame robot controller offered by its manufacturers.

The pressure foot (3) is formed by a hood, encasing the machining tool (4) and provided with side windows (11) that allow the video cameras (7) to view the machining tool (4) located inside it and its work surface and the projection of the laser device (15). These side windows (11) of the pressure foot (3) have closures (12) that block the video cameras' (7) view of the machine tool (4) located inside it, preventing swarf from coming out during machining.

The closures (12) of the side windows (11) of the pressure foot (3) are achieved, in a preferred embodiment, by means of a concentric second hood (13) of the pressure foot (3), provided with the capacity to rotate in relation to the latter, provided with openings that coincide with the side windows (11) in an open position, and which, via rotation between the second hood (13) and the pressure foot (3), in a closed position causes the non-coincidence of the openings with the side windows (11), closing the pressure foot (3). This concentric second hood (13) may be inside or outside the pressure foot (3).

The computer (8), which is connected via the communications module (10), between the robot controller module (2) and the robot arm (1), carries out corrections to the orders of the robot controller module (2) according to the image received by the video cameras (7) that form the vision equipment.

This machining head with vision entails a specific operating procedure that is divided into several phases: a first phase of measuring on the workpiece to be machined, a second phase of positioning the head at the target work point, a third phase of correcting the position of the head by means of vision and a fourth phase of machining or a specific operation.

In the first phase of measuring, in order to improve the positioning accuracy of the robot references points are taken, via the video cameras (7) that form the vision equipment, on the workpiece to be machined, in the zone near to the area to be machined, taking a minimum of two points to plot a virtual line, or, if a reference plane is to be determined, the system will require at least three points.

For this purpose the reference points are determined in a first step. In a second step the positioning on the line or plane that the previously calculated reference points create is determined and in a third step, via the specific software (9) incorporated in the computer (8), a prediction or estimation is made of the positioning errors that the robot (2) is going to make when it is directed to an intermediate point between the references taken, and hence, the final position can be corrected.

The first step in which the reference points are determined, includes the following operations:
Reference point 1 is measured with the vision equipment in position 1
The robot (2) repositions to the new position 1, now position 2, by means of the data measured.
The machining head carries out translation/rotation, preferably 10 mm (nm)
It returns to position 2
Reference point 1 is measured again.
The robot (2) repositions to the new position 2, now position 3, by means of the data measured.
The machining head carries out translation/rotation, preferably 10 mm (nm)
It returns to position 3
Reference point 1 is measured and stored as the control point These operations are repeated to determine each of the reference points.

The second step, in which the positioning on the line or plane created by the previously calculated reference points is determined, includes the following operations:
The real distance between each two reference points is entered.
Via the specific software (9) incorporated in the computer (8), the corrections that must be applied to the intermediate points of the line or plane created by the reference points, determined by the real value of the said reference points, are calculated.

The second phase of positioning the head in the zone to be machined comprises a first step of moving the head, via the movement of the robot arm (1) ordered by the robot controller module (2), to the coordinates at which machining is required.

The third phase of correcting the position of the head via the vision equipment comprises a first step that is performed in two ways depending on the type of material or surface to be machined:
In the case of a normal surface that is not shiny or polished, a reference image of the workpiece is taken by means of the video cameras (7) that form the vision equipment, through the side windows (11) of the pressure foot (3), that will be in their open position, in which, by analyzing its roughness via the specific software (9) incorporated in the computer (8), the target point can be located before the application of the forces that deform the robot (2), identifying it by the image of its roughness.

In the case of a very shiny or polished surface, the head itself makes a small mark or pecking, acting lightly with the machining tool (4) on the target point of the workpiece surface of which a reference image will be taken via the video cameras (7) that form the vision equipment, through the side windows (11) of the pressure foot (3) that will be in their open position, upon application of additional forces, identifying it, by means of the image of the said mark, as a reference.

The third phase of correcting the position of the head via the vision equipment proceeds with a second step of the descent of the pressure foot (3), by means of the vertical movement device (5), onto the surface to be machined. This descent, with the consequent force exerted by the pressure foot (3) on the zone to be machined, causes the movement of the robot arm (1), which involves a deviation from the position and orientation originally required, entailing a positioning error. A third step follows in which the vision system, comparing the image obtained now by the video cameras (7) which form the vision equipment, through the side windows (11) of the pressure foot (3), which will remain in their open position, with the reference image obtained in the first step and which is used as a reference, generates an order for the robot arm (1) to move in the required direction, again taking another image of the surface to be machined, through the side windows (11) of the pressure foot (3), repeating this phase until the image coincides with the reference image, around the operating point, that is, until the coordinates of the current operating point coincide with those established in the second phase of positioning the head, and the orientation achieved coincides with that required, which may be that of the reference obtained in the first step, or simply the normal to the surface at the operating point, eliminating the warping error and movement error of the pressure foot (3).

The fourth phase of machining comprises a first step of mechanical locking (6) of the vertical movement device (5) of the pressure foot (3), a second phase of activation of the closures (12) of the side windows (11) of the pressure foot (3) and a third phase of the machining tool (4) located inside it, to carry out machining on the surface.

Optionally a prior calibration phase can be included, which consists of using a calibrating tool (14) to adjust the head's operating parameters, in such a way that, in the said calibration phase the correlation is found between the 3 coordinates systems: that of the machining tool, that of the vision system and that of the robot controller.

The vision equipment also allows the robot arm (1) to be provided with additional features, such as for example, real-time measuring of perpendicularity, measuring of targets, measuring of diameters, quality control of rivets and others.

The invention claimed is:
1. Automated machining head with vision, of the type used industrially associated with robot arms (1), to perform various machining tasks controlled by a robot controller module (2) comprising:
a pressure foot (3), encasing the machining tool (4),
the said pressure foot (3) associated with a vertical movement device (5) provided with mechanical locking (6)
vision equipment provided with at least two video cameras (7), connected to a computer (8) provided with specific software (9), and
a communications module (10), wherein the pressure foot (3) is formed by a hood provided with side windows (11) that allow video cameras (7) to view the workpiece surface and the machining tool (4).

2. Automated machining head with vision, according to claim 1, wherein the vision equipment comprises a laser device (15) that projects a cross-shaped beam.

3. Automated machining head with vision, according to claim 1, wherein the side windows (11) of the pressure foot (3) have closures (12) that block the video cameras' (7) view of the machine tool (4) located inside it, preventing swarf from coming out during machining.

4. Automated machining head with 3D vision, according to claim 3, wherein the closures (12) of the side windows (11) of the pressure foot (3) are achieved by means of a concentric second hood (13) of the pressure foot (3) provided with the capacity to rotate in relation to the latter, and provided with openings coincident with the side windows (11) in an open position, and non-coincident in a closed position of the pressure foot (3).

5. Operating procedure of an automated machining head with vision according to in claim 4, wherein the computer (8) carries out corrections to the orders of the robot controller module (2) according to the image received from the video camera or video cameras (7) that form the vision equipment, comprising the steps of:
 a first phase of measuring on the workpiece to be machined,
 a second phase of positioning the head at the target work point,
 a third phase of correcting the position and orientation of the head via vision, and
 a fourth phase of machining or a specific operation for which the device has been designed.

6. Operating procedure of an automated machining head with vision, according to claim 5, wherein in the first phase of measuring, reference points are taken via the video cameras (7) that form the vision equipment, on the workpiece to be machined in the zone near to the area to be machined, taking a minimum of two points to plot a virtual line, or a minimum of three points to determine a reference plane, including
 a first step of determining the reference points,
 a second step of determining the positioning on the line or plane that the previously calculated reference points create, and
 a third step of predicting or estimating, via specific software (9) incorporated in the computer (8), the positioning errors that the robot (2) is going to make when directed to an intermediate point between the references taken, and thus, the final position can be corrected.

7. Operating procedure of an automated machining head with vision, according to claim 6, wherein the step of determining the reference points includes
 a first operation in which reference point 1 is measured with the vision equipment in position 1
 a second operation in which the robot (2) repositions to the new position 1, now position 2, by means of the measured data,
 a third operation in which the machining head carries out a translation/rotation,
 a fourth operation in which the robot (2) returns to position 2,
 a fifth operation in which reference point 1 is measured again,
 a sixth operation in which the robot (2) repositions to the new position 2, now position 3, by means of the measured data,
 a seventh operation in which the machining head carries out a translation/rotation,
 an eighth operation in which the robot (2) returns to position 3, and
 a ninth operation in which reference point 1 is measured and is stored as the control point, these operations being repeated for each of the reference points.

8. Operating procedure of an automated machining head with vision, according to claim 6, wherein the step of determining the positioning on the line or plane that the previously calculated reference points create, includes
 a first operation in which the real distance between each two reference points is entered, and
 a second operation in which, via the specific software (9) incorporated in the computer (8) the corrections that must be applied to the intermediate and/or near points of the line or plane created by the reference points, determined by means of the real value of the said reference points, are calculated.

9. Operating procedure of an automated machining head with vision, according to claim 5, wherein the second phase of positioning the head in the zone to be machined comprises a step of moving the head, via the movement of the robot arm (1) ordered by the robot controller module (2), to the coordinates at which machining is required.

10. Operating procedure of an automated machining head with vision, according to claim 5, wherein the third phase of correcting the position of the head via vision, comprises a first step in which, in the case of normal surfaces that are not shiny or polished, a reference image of the workpiece is taken by means of the video cameras (7) which form the vision equipment, through the side windows (11) of the pressure foot (3), that will be in the open position, analyzing surface roughness via the specific software (9) incorporated in the computer (8) and locating the operating point in relation to it.

11. Operating procedure of an automated machining head with vision, according to claim 5, wherein the third phase of correcting the position of the head via vision comprises a first step in which, in the case of very shiny or polished surfaces, the head itself makes a small mark or pecking, acting lightly with the machining tool (4) on the target point on the workpiece surface of which a reference image will be taken via the video cameras (7) that form the vision equipment, through the side windows (11) of the pressure foot (3), that will be in the open position, prior to the application of additional forces, identifying it, by means of the image of the said mark, as a reference.

12. Operating procedure of an automated machining head with vision, according to claim 5, wherein the third phase of correction of the position of the head by means of vision includes
 a second step of descent of the pressure foot (3), by means of the vertical movement device (5), onto the surface to be machined in which the consequent force exerted by the pressure foot (3) on the zone to be machined, causes the movement of the robot arm (1), which involves a deviation from the position and orientation originally required, entailing a positioning error, followed by
 a third step in which the vision system, comparing the image obtained now by the video cameras (7) which form the vision equipment, through the side windows (11) of the pressure foot (3), which will remain in the open position, with the reference image obtained in the first step and which is used as a reference, generates an order for the robot arm (1) to move in the required direction, again taking another image of the surface to be machined, through the side windows (11) of the pressure foot (3), repeating this phase until the image coincides with the reference image around the operating point, that is, until the coordinates of the current operating point coincide with those established in the second phase of positioning the head, and the orientation achieved coincides with that required, which may be that of the reference obtained in the first step, or simply the normal to the surface at the operating point.

13. Operating procedure of an automated machining head with vision, according to claim 5, wherein the fourth phase of machining comprises a first step of mechanical locking of the vertical movement device (5) of the pressure foot (3), a second step of activation of the closures (12) of the side windows (11) of the pressure foot (3), and a third phase of the machining tool (4) located inside it, to perform the machining of the surface.

14. Operating procedure of an automated machining head with vision, according to claim 5, further comprising a prior optional calibration phase, which consists of using a calibrating tool (14) to adjust the head's operating parameters, in such a way that in the said calibration phase the correlation is found between the coordinates system of the machining tool, that of the vision system and that of the robot controller.

* * * * *